March 11, 1947. C. E. COX 2,417,352
FLOWMETER
Filed June 19, 1944 2 Sheets-Sheet 1

INVENTOR.
Claude E. Cox
BY Parker & Burton
attorneys

March 11, 1947.　　　C. E. COX　　　2,417,352
FLOWMETER
Filed June 19, 1944　　　2 Sheets-Sheet 2
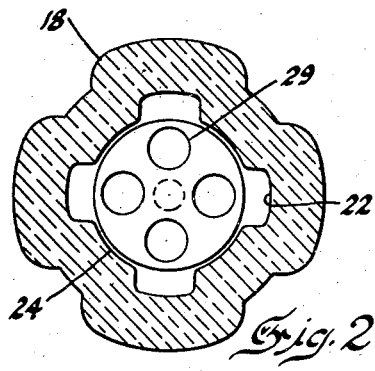
Fig. 2
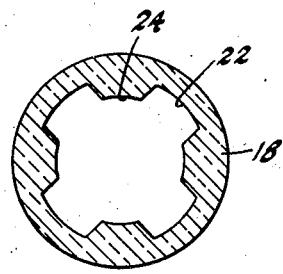
Fig. 8
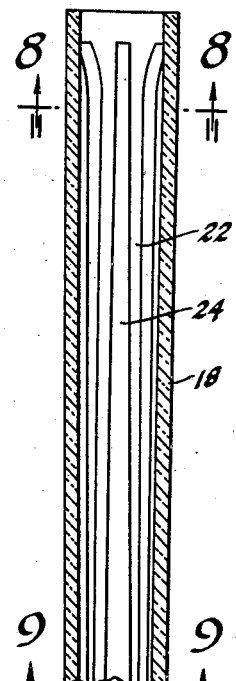
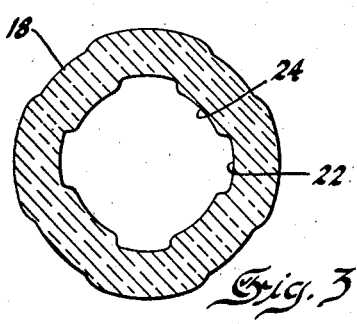
Fig. 3
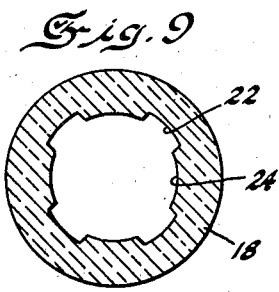
Fig. 9
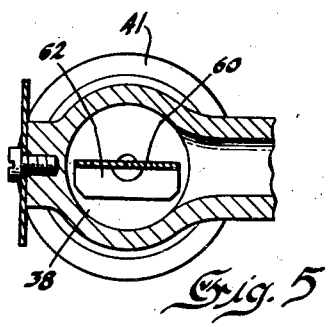
Fig. 5
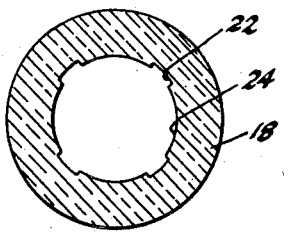
Fig. 10
Fig. 7
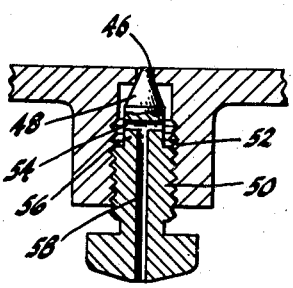
Fig. 6
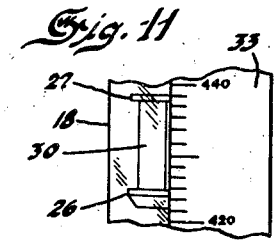
Fig. 11
INVENTOR.
Claude E. Cox
BY Parker & Burton
attorneys Patented Mar. 11, 1947

2,417,352

UNITED STATES PATENT OFFICE 2,417,352

FLOWMETER

Claude E. Cox, Detroit, Mich.

Application June 19, 1944, Serial No. 541,037

11 Claims. (Cl. 73—209)

This application relates to a fluid flow indicator or flowmeter and is a continuation in part of my application Ser. No. 502,168, filed September 13, 1943, Patent No. 2,389,957, granted November 27, 1945, which application is in turn a continuation in part of my application 427,759, filed January 22, 1942, Patent No. 2,384,800, granted September 18, 1945.

An object is to provide a fluid flow indicator which is simple, compact, accurate and easily read. More particularly, an object is to provide a fluid flowmeter in the form of a transparent tube having a fluid inlet at one end and a fluid outlet at the opposite end and suitably supported by end fittings to be connected in a fluid line whereby fluid may be passed through the fluid passage bore of the tube, which bore is provided with a fluted fluid passage portion tapering in cross sectional area from one end to the other, and which portion is provided with a plurality of circumferentially spaced apart linearly extending lands, the inner surfaces of which lands extend parallel to the axis of the bore and guide the movement of the fluid responsive float on a true axial line through the bore.

The flowmeter tube is adapted to be connected in a fluid flow line as, for example, a fuel line leading to a carburetor which is being tested so that the liquid fuel flow which is to be measured enters through the small end of the bore and flows upwardly through the tube and leaves at the large end of the bore. A fluid indicator float is mounted within the tube and is responsive to the flow of fluid through the tube. The float indicator is guided in its movement through the tube by the lands. The indicator is so formed and the lands are so constructed and arranged that the float is caused to travel along the true axial line of the bore without any resulting tilting or wobble which would interfere with the accuracy of measurement.

The flowmeter tube is transparent and may be formed of glass or any other suitable material so that the metering float is readily visible for direct reading against a scale as the float travels through the tube. The position of the float within the tube is determined by the rate of flow of fluid through the tube. The restricted fluid passageway about the float is measured by the collective cross sectional area at any point about the float of the several flutes which intervene the lands that guide the float.

The cross sectional area of each flute tapers from top to bottom. Such taper may be the result of constantly increasing the depth of the flute throughout its length from bottom to top, or of constantly increasing its width from bottom to top. Both forms are shown in the drawings.

The inner surfaces of the lands extend parallel to the axis of the bore of the tube and are preferably linear segments of a cylinder, the axis of which coincides with the axis of the tapered fluid passage bore through the tube. The inner surfaces of the lands are cleaned by the sliding action of the float thereover and therefore do not collect fluid-carried material which would impede the movement of the float along the lands and thus interfere with accuracy of reading.

It is necessary that the float in its slidable movement within the tube be held by the lands against wobble or tilting during its travel through the bore in order that the segments of the annulus established by the several flutes between the float indicator and the wall of the tube at any position of the float should constitute segments of a true annulus. This assures accuracy of measurement. If wobble or tilting were permitted, as might well occur in the movement of a float through a tapered tube and wherein the float was not guided as herein set forth, the restriction established between the float and the wall of the tube would vary from that of a true annulus and accuracy of measurement would not be possible.

A meritorious feature of this invention is that due to the construction of the tube, and also the construction of the float, accuracy of movement of the float through the tube along a true axial line is achieved. Such a fluid flow indicator is particularly useful in research work, such as measuring fuel fed to an internal combustion engine. The scale which measures the movement of the float may be calibrated to read in pounds or gallons per hour, or as desired.

Other objects, advantages and meritorious features of the invention will more fully appear from the following description, appended claims and accompanying drawings wherein:

Fig. 1 is a vertical sectional view through an upright fluid flowmeter tube embodying the invention.

Figs. 2 and 3 are cross sectional views taken along lines 2—2 and 3—3 respectively of Fig. 1.

Fig. 4 is a vertical sectional view of the flowmeter tube mounted within end fittings.

Fig. 5 is a cross sectional view taken on line 5—5 of Fig. 4.

Fig. 6 is a cross sectional view taken on line 6—6 of Fig. 4.

Fig. 7 is a vertical sectional view through a flowmeter tube of modified construction.

Figure 1:
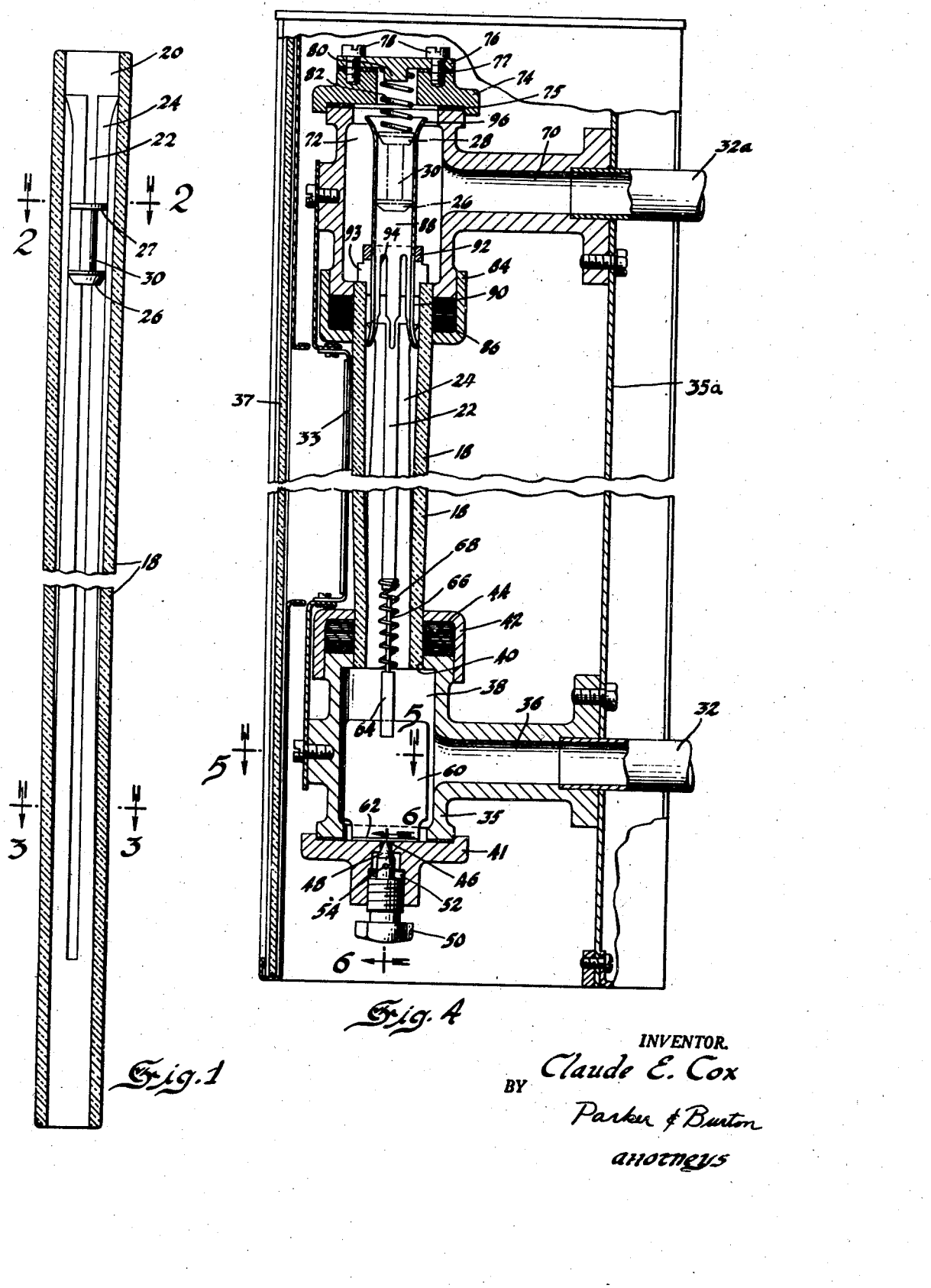

Figs. 8, 9 and 10 are horizontal cross sectional views taken on line 8—8, 9—9 and 10—10 respectively of Fig. 7.

Fig. 11 is a fragmentary front elevation of a tube and scale.

In the drawings the improved flowmeter tube 18 may be formed of glass or other suitable transparent material and has a bore 20 which defines a fluid flow passageway therethrough and exhibits a fluid inlet at the bottom and a fluid outlet at the top. An intermediate portion of the bore defined by the flutes 22, which flutes are separated by lands 24, is tapered as to cross sectional area from top to bottom. Four flutes and four lands are here shown in each of the several figures. The lands 24 are spaced apart circumferentially by the flutes and extend linearly of the axis of the bore. The flutes establish the taper of the fluid passage bore as may be seen from the drawings. The tapered bore of the construction of the Figs. 1 through 4 is formed by increasing the radial depth of the flutes from bottom to top. The taper shown in construction of Figs. 7 through 10 is formed by increasing the width as well as the depth of the flutes from bottom to top. In each modification there is a progressive taper from top to bottom of the fluid flow passageways defined by the flutes.

This taper is accurately formed. The tube may be formed on a mandrel to establish the flutes of Figs. 1 through 4 as described in my co-pending application 427,759 herein above referred to. The taper established by the flutes in the construction of Figs. 1 through 4 may have straight sides or the sides may be so curved as to give a calibration curve of logarithmic form. The latter has some advantages. It is not here shown because the curvature of the flutes is so small that it would not be readily apparent in the drawing of the instant size.

The inner faces of the lands 24 are accurately formed parallel to the axis of the bore and equidistant therefrom. The faces of the lands therefore extend parallel to the axis of the tube and as here shown constitute linear segments of a cylinder, the axis of which coincides with the axis of the truncated conical bore established by the bottoms of the flutes in the construction of Figs. 1 through 4, and with the axis of the tapered fluid flow passageway established by the flutes in the construction of Figs. 7 through 10.

Within the bore of the tube is mounted a metering float which is responsive to the flow of liquid through the tube. This float consists of a cylindrical stem 30 having a body portion or bottom flange 26 and a top flange portion 28. The flanges have peripheral cylindrical faces which establish a sliding fit with the lands 24 of the tube. The stem supplies most of the weight of the float and the flanges are of equal diameter and form free sliding engagement within the lands 24 so that the float rises along a true axial line within the tube.

Flanges 26 and 28 are spaced apart axially upon the stem 30 of the float a distance greater than the diameter so that any tendency of the float to tilt in response to the turbulent flow of liquid over the float is prevented. The lands so guide the float within the tube that it will not wobble and the fluid passageway established by the float within the bore relative to the bottoms of the several flutes 22 constitute segments of a true annulus and such annulus will not temporarily assume a crescent shape as would be the case if the float were to wobble in its rise through a tapered tube.

The tapered bore established by the bottoms of the flutes substantially merges with the lands at the lower end of the tapered portion of the bore. Below the fluted portion the bore is cylindrical. Above the fluted portion the bore is cylindrical although the diameter of the cylindrical portion above the flutes is greater by the amount of the radial taper than the diameter of the cylindrical portion below the flutes.

When put into use the flowmeter tube is mounted in a fluid flow line as indicated by conduits 32 and 32a in Fig. 4. The fluid is passed upwardly through the tube. The float indicator rises and falls in response to variations in the rate of flow through the tube. The position of the indicator float within the tube may be read upon the scale 33 in any desired rate of flow measurement with which the scale may be calibrated. Obviously if desired the scale might be etched on the outer surface of the glass tube or marked upon a part of the housing 35a which housing may be attached to the fittings connected to pipes 32 and 32a and form an enclosure about the metering tube, such enclosure being provided with a glass window 37. Where it is desired to measure flows of substantial volume, a plurality of fluid flowmeter tubes may be arranged in series as illustrated in my co-pending application 502,168 above referred to.

In Fig. 4 there is shown a float such as is described more in detail in my copending application 508,194, filed October 29, 1943. As heretofore described, such a float comprises a stem portion 30 provided with upper and lower radial circular flanges 28 and 26 respectively, which flanges are of equal diameters and complementary in form. These flanges have peripheral cylindrical faces which form a sliding fit within the lands to guide the float in its travel through the tube. Each flange is provided below its peripheral cylindrical face with an inwardly downwardly extending frusto-conical face. The flanges are spaced axially apart a distance greater than the diameter so that the float will not tilt in its travel. Such a float is of a spool-like configuration.

The float shown in Fig. 1 is of modified form. In such figure, the float is provided with a bottom flange of the character above described but the top flange is in the form of a flat radial disc 27, which disc may be provided with apertures 29 as shown in Fig. 2 to permit a free flow of liquid therethrough. With such a float, the metering is accomplished by the lower flange only. Each flange however exhibits a peripheral cylindrical face which forms a sliding fit with the lands of the tube. With the float of Fig. 4 both the upper and lower flanges establish restrictions to flow of the liquid and collectively determine the position of the float within the tube.

The tube is provided with upper and lower fittings as shown particularly in Fig. 4. Tube 18 is supported within a bottom fitting 35 having a fluid inlet passage 36 opening into a chamber 38, which chamber in turn opens upwardly into the interior of the tube. The tube is received within an opening 40 through the top of chamber 38 and is held in place by means of an apertured cap 42, which cap has an opening aligned with the opening into the fluid chamber 38 and through these openings the tube extends as shown in Fig. 4. The cap is press fitted or threaded over the wall of chamber 38 and suitable packing material 44 frictionally retains the tube in position and eliminates the possibility of leakage.

The bottom of fitting 35 is closed by a bottom cap 41 provided with an opening 46 which opening is normally closed by the tapered seating surface 48 of a valve member 50 threaded into a recess 52 in the bottom cap 41 of the fitting. Valve member 50 is provided with radial passages 54 opening from the outer surface of the portion 56 of the valve reduced in diameter with respect to the diameter of recess 52, which passages converge and open into an axial passageway 58 extending through valve 50. This arrangement permits readily bleeding each tube of any fluid left therein after an operation, since, when the valve is backed away from its seat within the fitting, the fluid in the tube passes through opening 46 into recess 52 and thence through passages 54 into the axial passage 58 and out.

A baffle 60 extends vertically through a substantial portion of chamber 38, being secured to the base thereof by means of a foot 62 which is soldered or secured in some other suitable fashion to the base of the chamber. This baffle is of less width than the diameter of the fluid chamber and is disposed parallel to the axis of the inlet and the axis of the bore of the tube and serves to provide an even flow by eliminating swirling, and by stabilizing and straightening out the flow of liquid as it passes up into the indicator tube 18. Secured to the upper part of the baffle in some suitable fashion, as by means of soldering thereto a base plate 64, is a pin 66 which extends somewhat up into tube 18 and serves as a seat for spring 68, thereby providing a resilient bottom stop for the indicator float when the instrument is not in use.

The upper end of tube 18 extends into a fitting substantially like the fitting at the lower end of the tube and including an outlet passage 70 opening from a fluid chamber 72. Closing the opening in the upper end of chamber 72 is an apertured cap 74 which seats upon a gasket 75 and is press fitted or threaded over the upper end of the chamber wall. The opening in cap 74 is covered by a closure member 76 which seats upon a gasket 77 surrounding the opening and which may be held down by means of screws 78. The under face of closure member 76 is provided with a projecting lug 80 which extends into the opening of cap 74 and provides a seat for the upper extremity of coil spring 82, which is secured thereto or to the under face of closure member 76 by means of soldering or otherwise. This spring extends down into fluid chamber 72 to thereby provide a resilient upper stop for the indicator float as will be more clearly brought out hereinafter.

Press fitted or threaded over the lower wall of chamber 72 is a cap 84 which, like cap 42, is provided with a central opening in alignment with the opening at the lower extremity of chamber 72. The upper extremity of tube 18 extends through these aligned openings and packing material 86 serves both to retain the upper end of the tube accurately positioned and prevent leakage.

A tubular sleeve 88, preferably of metal and provided at its lower extremity with spaced expansion fingers 90 which are received within flutes or grooves 22 of the tube 18, is provided with a collar 92 secured in some suitable fashion thereto and provided with a shoulder which seats upon the upper extremity of tube 18, thereby definitely positioning the sleeve 88 longitudinally with reference to the tube 18. The expansion fingers 90 serve to stabilize the gravity support provided by the collar 92. The expansion fingers extend within the flutes 22 and are turned outwardly at the ends as shown toward the bottoms of the flutes but extend inwardly as they extend upwardly so that they are substantially flush with the inner surfaces of the lands so as to form a sliding fit with the float and guide the float as it rises upwardly within the tubular sleeve 88 as shown in Fig. 4.

Collar 92 is slotted as at 93 and is secured to the sleeve 88 with the slots 93 in alignment with the slots or openings 94 in the wall of the sleeve, which slots 94 lie between the expansion fingers 90 and form a passageway for the flow of liquid therethrough into the chamber 72 to pass out through the outlet passage 70. The upper extremity of the tube 88 is flared as indicated at 96 to provide a shield for the lower extremity of coil spring 82. The diameter of tube 88 corresponds to the maximum diameter of the indicator float and serves as a guide for the same as it moves upwardly through fluid chamber 72 toward the stop provided by spring 82.

From the foregoing description it will be apparent that when the upward flow in tube 18 is sufficient to carry the indicator float beyond the upper extremity of indicator tube 18 and beyond the upper limit of reading on that particular tube, as provided by the scale, the fluid moving upwardly through the tube will pass through slots 94 and registering openings 93 in collar 92 into the upper fluid chamber 72 and thence through outlet passage 70 and exhaust 32a. No reading can of course be taken when the float passes up into the sleeve 88 and this structure is particularly intended for use when a plurality of tubes are arranged in series as described in my copending application 502,168.

In addition to the unusual accuracy of measurement obtainable by this fluted indicator tube and its associated float, it should be noted that there are numerous advantages in the assembly as a whole and the particular manner in which the various elements are arranged with reference to one another. While the glass of which the transparent indicator tubes 18 are preferably constructed has a particularly hard, smooth and dense surface and therefore does not tend to trap foreign matter which may enter the tube, the transparency of the tube renders such foreign matter easily detectable, and the wall of the indicator float as it moves along the lands which guide its passage up and down the tube, by virtue of the density and hardness of the wall surface is enabled to free the lands of substantially all such foreign matter as may cling thereto.

Despite the unusual efficiency of the arrangement in eliminating inaccuracies by keeping the land surfaces free and clear of foreign matter, such matter ultimately may necessitate disassembly of one or more of the tube assemblies for cleaning purposes. The arrangement disclosed and claimed by me is particularly suitable for rapid and facile performance of this operation.

The fluid flowmeter tube 18 may be readily withdrawn from an assembly such as is shown in Fig. 4 by removing the cap 74 which covers the fluid chamber opening 72 in the upper fitting. The tube may then be readily withdrawn. The caps 84 and 42 may be backed off if necessary to facilitate removal of the tube. Following cleaning the assembly may be again put together.

What I claim is:

1. A fluid flow indicator comprising a transparent upright tube provided with a fluid passage bore having a fluid inlet at one end and a fluid outlet at the opposite end, said bore having a portion provided with a plurality of linearly extending circumferentially spaced apart lands whose inner faces extend parallel to the axis of the bore, that portion of the bore between the lands tapering in cross sectional area from top to bottom, an indicator float disposed within the bore for axial floating movement therethrough as guided by said lands, said float being of spool-like configuration and consisting of an axial stem provided with equal diameter radial end flanges spaced apart axially a distance greater than a diameter, each flange having a peripheral face forming a sliding fit with the inner faces of said lands and defining fluid passages between the lands of constantly varying size throughout the length thereof, and a scale extending linearly of the bore to register the movement of the float therethrough.

2. A fluid flow indicator comprising a transparent upright tube provided with a fluid passage bore having a fluid inlet at one end and a fluid outlet at the opposite end, said bore having a portion provided with a plurality of linearly extending circumferentially spaced apart lands whose inner faces constitute linearly extending circumferentially spaced segments of a cylinder whose axis coincides with the axis of the bore, that portion of the bore between the lands tapering in cross sectional area from top to bottom, an indicator float mounted within the bore for axial travel therethrough, said float being of spool-like configuration and consisting of an axial stem provided with equal diameter circular end flanges spaced apart axially a distance not less than a diameter, each flange having a peripheral cylindrical face forming a sliding fit with said lands, an end fitting receiving the lower end of the tube and having a fluid chamber forming an extension of the bore of the tube and provided with a fluid inlet, a baffle disposed within said chamber in the path of fluid flow, resilient means carried by the baffle axially aligned with the tube bore and extending upwardly thereinto and adapted to seat the float at the lower end of its travel through the tube, an end fitting receiving the upper end of the tube and having a fluid chamber forming an extension of the bore of the tube and provided with a fluid outlet, resilient means mounted within said last named fitting axially aligned wtih the bore of the tube and terminating spaced thereabove adapted to seat the float at the upper limit of its travel, means guiding said float in said last named fitting above the tube and a scale extending linearly of the bore to register the movement of the float through the tube.

3. In a fluid flow indicator the combination with a transparent fluid flow meter tube having a portion of its bore tapering in cross sectional area from top to bottom and having a float indicator mounted therein for axial travel therethrough of a fluid connection receiving the upper end of the tube and communicating therewith and having a fluid outlet, a fitting receiving the lower end of the tube and having a fluid chamber forming an extension of the tube bore and communicating therewith and provided with a fluid inlet, a baffle positioned within the chamber in a plane parallel to and lying in the path of fluid flow into the chamber through said inlet, and a resilient element supported upon said baffle in line axially with the tube and extending upwardly thereinto and adapted to seat the float at the lower end of its travel through the tube.

4. In a flowmeter, an upright transparent flowmeter tube having a fluid inlet at one end and a fluid outlet at the opposite end and having a fluid passage bore between said inlet and outlet having a portion provided with a plurality of linearly extending circumferentially spaced apart lands the inner faces of which extend parallel to the axis of the bore, said lands defining therebetween fluid passage flutes of tapered cross sectional area, a metering float disposed within the bore for axial floating movement therethrough as guided by said lands, a fitting secured to the top of the tube providing a fluid outlet chamber forming an extension of the tube bore and having a fluid outlet, a sleeve within said fitting superimposing the bore of the tube and provided with a plurality of expansion fingers received within the tube and seated within the flutes of the tube, said sleeve having a diameter equal to the diameter established by the inner faces of the lands and having fluid openings between said fingers communicating with the fluid chamber in the fitting.

5. In a flowmeter, an upright transparent tube having a fluid passage bore provided with an inlet at the bottom and an outlet at the top, said bore having a portion provided with a plurality of linearly extending circumferentially spaced apart lands, the inner faces of which constitute linear ports of the periphery of a cylinder the axis of which coincides with the axis of the bore, said lands defining therebetween fluid passage flutes of constantly increasing depth from bottom to top, a fitting receiving the upper end of the tube and having a fluid outlet communicating with the tube bore, a fitting receiving the lower end of the tube and having a fluid inlet communicating with the tube bore, a metering float disposed within the bore for axial travel therethrough, said float being of spool-like configuration consisting of an axial stem provided with equal diameter radial end flanges spaced apart axially a distance not less than the diameter of said flanges, each flange having a periphery forming a sliding fit with said lands within the tube.

6. In a flowmeter, an upright transparent tube having a fluid passage bore provided with an inlet at the bottom and an outlet at the top, said bore having a portion provided with a plurality of linearly extending circumferentially spaced apart lands, the inner faces of which constitute linear ports of the periphery of a cylinder the axis of which coincides with the axis of the bore, said lands defining therebetween fluid passage flutes of constantly increasing width from bottom to top, a fitting receiving the upper end of the tube and having a fluid outlet communicating with the tube bore, a fitting receiving the lower end of the tube and having a fluid inlet communicating with the tube bore, a metering float disposed within the bore for axial travel therethrough, said float being of spool-like configuration consisting of an axial stem provided with equal diameter radial end flanges spaced apart axially a distance not less than the diameter of said flanges, each flange having a periphery forming a sliding fit with said lands within the tube.

7. In a flowmeter, an upright transparent flowmeter tube having a fluid inlet at one end and a fluid outlet at the opposite end and having a fluid passage bore between said inlet and outlet having a portion provided with a plurality of linearly extending circumferentially spaced apart lands the inner faces of which extend parallel to the axis of the bore, said lands defining therebetween fluid passage flutes of tapered cross sectional area, a metering float disposed within the bore for axial floating movement therethrough as guided by said lands, a fitting secured to the top of the tube providing a fluid outlet chamber forming an extension of the tube bore and having a fluid outlet, a sleeve within said fitting superimposing the bore of the tube and provided with a plurality of expansion fingers received within the tube and seated within the flutes of the tube, said sleeve having a diameter capable of receiving said float and provided with a fluid outlet opening.

8. In a flowmeter, an upright tube the inner wall of which defines a fluid passage bore having a fluid inlet at one end and a fluid outlet at the opposite end, said bore formed by the wall of the tube consisting of a cylindrical part defined by wall guide portions disposed equidistant from the axis of the bore and a bypass part extending linearly along and opening throughout its length into said cylindrical part and tapering in cross sectional area from one end to the other, an indicator float disposed within said cylindrical part in free slidable contact with the wall guide portions for up and down guided travel through said cylindrical part, said tube being integrally formed of material which is transparent throughout that portion of its wall which constitutes at least one wall guide portion whereby the travel of the indicator float therealong may be viewed directly through said wall guide portion.

9. In a flowmeter, an upright tube the inner wall of which defines a fluid passage bore having a fluid inlet at one end and a fluid outlet at the opposite end, the wall of the tube which forms said bore provided with a plurality of linearly extending circumferentially spaced apart lands integral therewith and whose inner faces constitute linear parts of the periphery of a cylinder the axis of which coincides with the axis of the bore, that portion of the bore between the lands tapering in cross sectional area from top to bottom, an indicator float disposed within the bore and having a periphery which forms free slidable contact with the inner faces of the lands for movement of the float axially through the bore as guided by said lands, said tube being of a generally cylindrical shape and formed integrally throughout of glass which is transparent throughout the length of that portion of the wall of the tube which constitutes at least one of said lands through which the travel of the float may be directly viewed.

10. In a flowmeter, an upright tube the inner wall of which defines a fluid passage bore having a fluid inlet at one end and a fluid outlet at the opposite end, the wall of the tube forming said bore provided with a plurality of linearly extending circumferentially spaced apart lands which are integral parts of the wall of the tube and whose inner faces are disposed parallel to the axis of the bore, that portion of the bore between the lands tapering in cross sectional area from top to bottom, an indicator float disposed within the bore, said float having a pair of peripheral portions which form free slidable contact with the inner faces of the lands for movement of the float axially through the bore as guided by said lands, said peripheral portions being disposed upon a stem and spaced apart axially thereon sufficiently to prevent tilting of the float within the bore, said tube being formed of material which is transparent throughout that portion of its wall that constitutes one of said lands whereby the travel of the float along the land may be viewed directly therethrough, the inner face of said land being wiped by the travel of the float thereover.

11. A flowmeter tube the inner wall of which defines a fluid passage bore having an opening at each end, the inner wall of the tube provided with a plurality of linearly extending circumferentially spaced apart lands integral therewith and whose inner faces are spaced equidistant from the axis of the bore of the tube, that portion of the bore between the lands defining a passageway which tapers in cross sectional area from one end to the other, asid tube being a one-piece, integral, molded, transparent glass tube throughout its landed portion at least.

CLAUDE E. COX.

REFERENCES CITED

The following references are of record in the file of this patent:

UNITED STATES PATENTS

| Number | Name | Date |
|---|---|---|
| 2,350,343 | Fischer | June 6, 1944 |
| 979,516 | Kuppers | Dec. 27, 1910 |
| 428,804 | Deacon | May 27, 1890 |
| 2,258,023 | McKernon | Oct. 7, 1941 |
| 2,333,884 | Porter | Nov. 9, 1943 |
| 1,580,678 | Roucka | Apr. 13, 1926 |
| 2,091,792 | Niesemann | Aug. 31, 1927 |
| 848,704 | Thomson et al. | Apr. 2, 1907 |
| 2,220,675 | Boehm | Nov. 5, 1940 |
| 2,262,807 | Larner | Nov. 18, 1941 |
| 2,388,672 | Brewer | Nov. 13, 1945 |
| 2,377,861 | Brewer | Jan. 12, 1945 |
| 2,370,634 | Brewer | Mar. 6, 1945 |
| 2,389,957 | Cox | Nov. 27, 1945 |
| 2,384,800 | Cox | Sept. 18, 1945 |

FOREIGN PATENTS

| Number | Country | Date |
|---|---|---|
| 192,455 | British | Jan. 29, 1923 |

OTHER REFERENCES

Page 107 of "Instruments," April, 1935, vol. 8, published by The Instruments Publishing Co., 1117 Wolfendale St., Pittsburgh, Pa. (Copy in Division 36, 73–209, U. S. Patent Office.)